US00RE38784E

(19) United States
(12) Reissued Patent
Maese et al.

(10) Patent Number: US RE38,784 E
(45) Date of Reissued Patent: Aug. 30, 2005

(54) APPARATUS FOR THE DESTRUCTION OF VOLATILE ORGANIC COMPOUNDS

(75) Inventors: Luis R. Maese, Glendale, AZ (US); Ram Srinivasan, Chandler, AZ (US); Stephen R. Thomas, Phoenix, AZ (US)

(73) Assignee: Vericor Power Systems LLC, Alpharetta, GA (US)

(21) Appl. No.: 10/010,043

(22) Filed: Dec. 6, 2001

Related U.S. Patent Documents

Reissue of:
(64) Patent No.: 5,673,553
Issued: Oct. 7, 1997
Appl. No.: 08/538,308
Filed: Oct. 3, 1995

(51) Int. Cl.[7] ..... F02C 7/00
(52) U.S. Cl. ..... 60/801; 60/39.463; 431/5
(58) Field of Search ..... 60/772, 39.12, 60/39.461, 39.463, 39.465, 39.826, 746, 801; 431/5, 278

(56) References Cited

U.S. PATENT DOCUMENTS

| | | | | |
|---|---|---|---|---|
| 2,660,032 A | * | 11/1953 | Rosenthal | 60/39.02 |
| 2,718,753 A | | 9/1955 | Bridgeman | |
| 2,718,755 A | | 9/1955 | Heller | |
| 2,828,605 A | * | 4/1958 | Dobson | 60/39.463 |
| 3,380,250 A | | 4/1968 | Whatley | |
| 4,197,701 A | | 4/1980 | Boyum | |
| 4,226,083 A | | 10/1980 | Lewis et al. | |
| 4,253,301 A | * | 3/1981 | Vogt | 60/39.826 |
| 4,292,801 A | | 10/1981 | Wilkes et al. | |
| 4,299,086 A | | 11/1981 | Madgavkar et al. | |
| 4,339,924 A | | 7/1982 | White et al. | |
| 4,374,184 A | | 2/1983 | Somers et al. | |
| 4,420,929 A | | 12/1983 | Jorgensen et al. | |
| 4,550,563 A | | 11/1985 | Marchand | |
| 4,702,073 A | | 10/1987 | Melconian | |
| 4,820,594 A | | 4/1989 | Sugita et al. | |
| 4,864,811 A | | 9/1989 | Pfefferle | |
| 4,910,957 A | | 3/1990 | Moreno et al. | |
| 5,216,876 A | | 6/1993 | Gabrielson et al. | |
| 5,237,812 A | | 8/1993 | Mumford | |
| 5,307,621 A | | 5/1994 | Glassman et al. | |
| 5,369,947 A | | 12/1994 | Dummersdorf et al. | |

FOREIGN PATENT DOCUMENTS

| | | |
|---|---|---|
| CH | 427 411 | 6/1967 |
| DE | 2 236 372 | 2/1974 |
| EP | 0 298 941 | 1/1989 |
| EP | 0 490 283 A2 | 6/1992 |
| WO | WO 95/02450 | 1/1995 |

* cited by examiner

*Primary Examiner*—Louis J. Casaregola
(74) *Attorney, Agent, or Firm*—Thomas, Kayden, Horstemeyer & Risley, L.L.P.

(57) ABSTRACT

A system for the destruction of volatile organic compounds while generating power. In a preferred embodiment the system comprises a combustor and a reaction chamber connected to an exit of the combustor. A primary inlet to the combustor supplies a primary fuel to the combustor. A secondary fuel, comprising air and an amount of one or more volatile organic compounds, is supplied to a compressor, which compresses the secondary fuel and directs the secondary fuel to the combustor and the reaction chamber. The system is suitably configured to enable the stoichiometric reaction of the two fuels in a manner sufficient to destroy the volatile organic compounds contained in the secondary fuel and power a turbine engine connected to an exit of the reaction chamber.

13 Claims, 5 Drawing Sheets

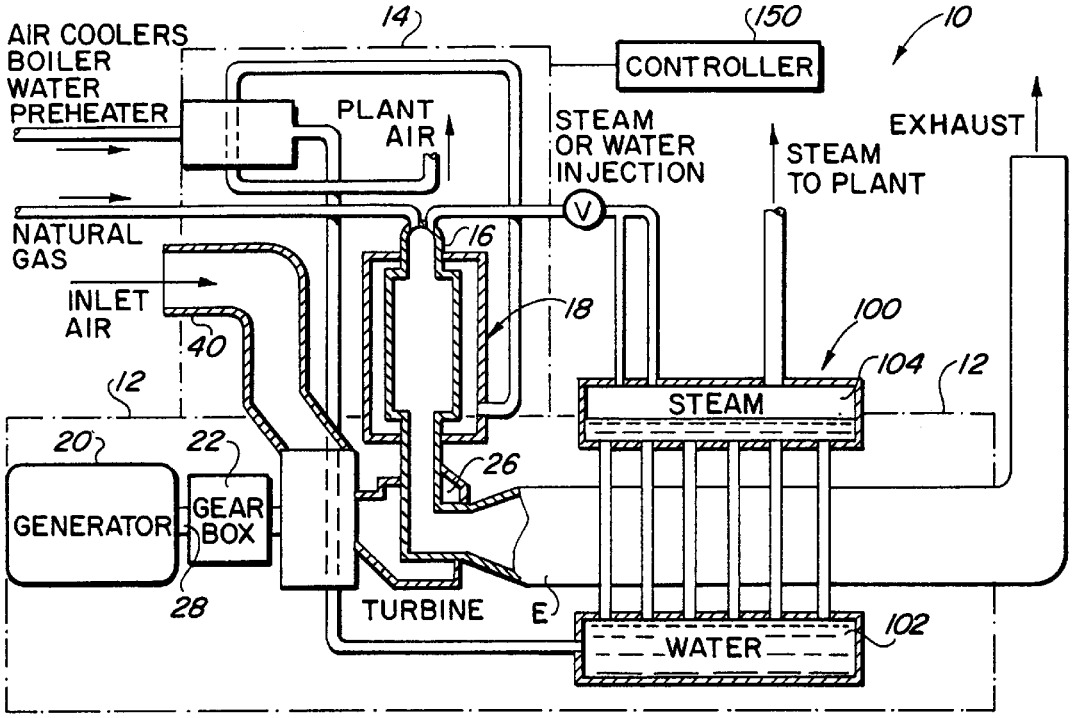
FIG. 2
FIG. 6
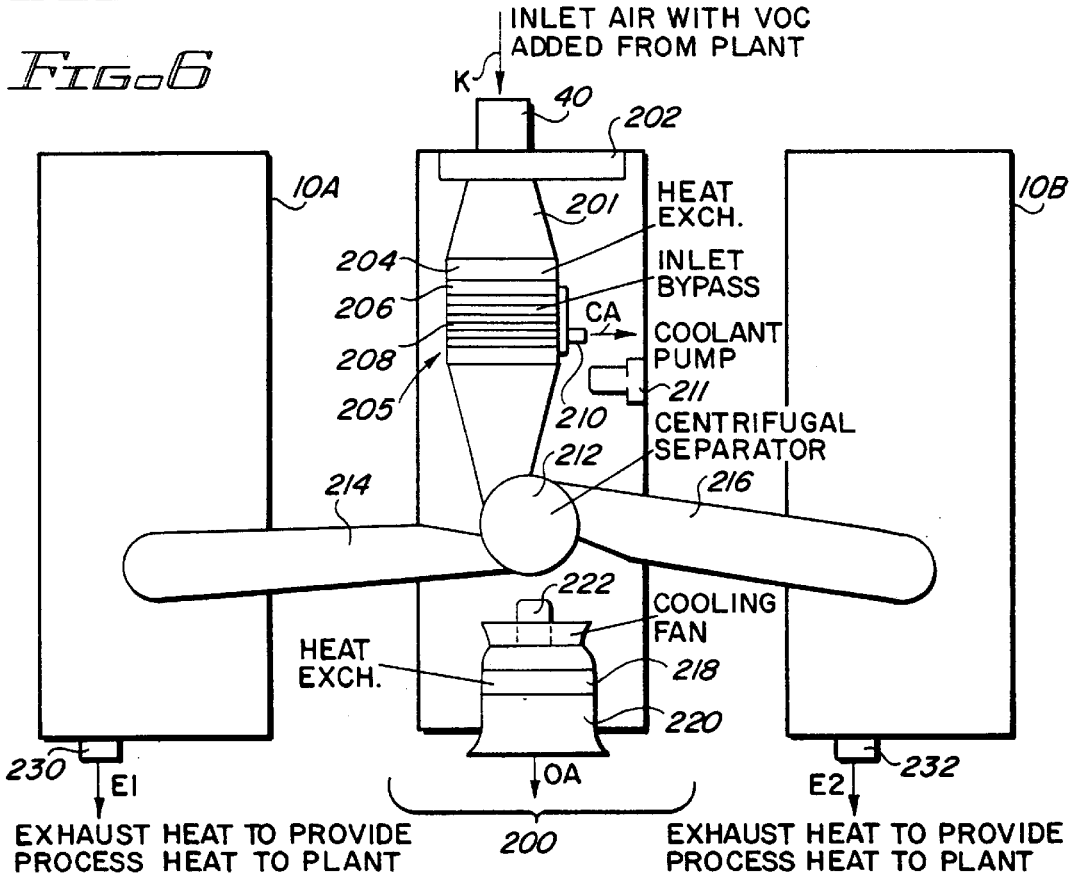

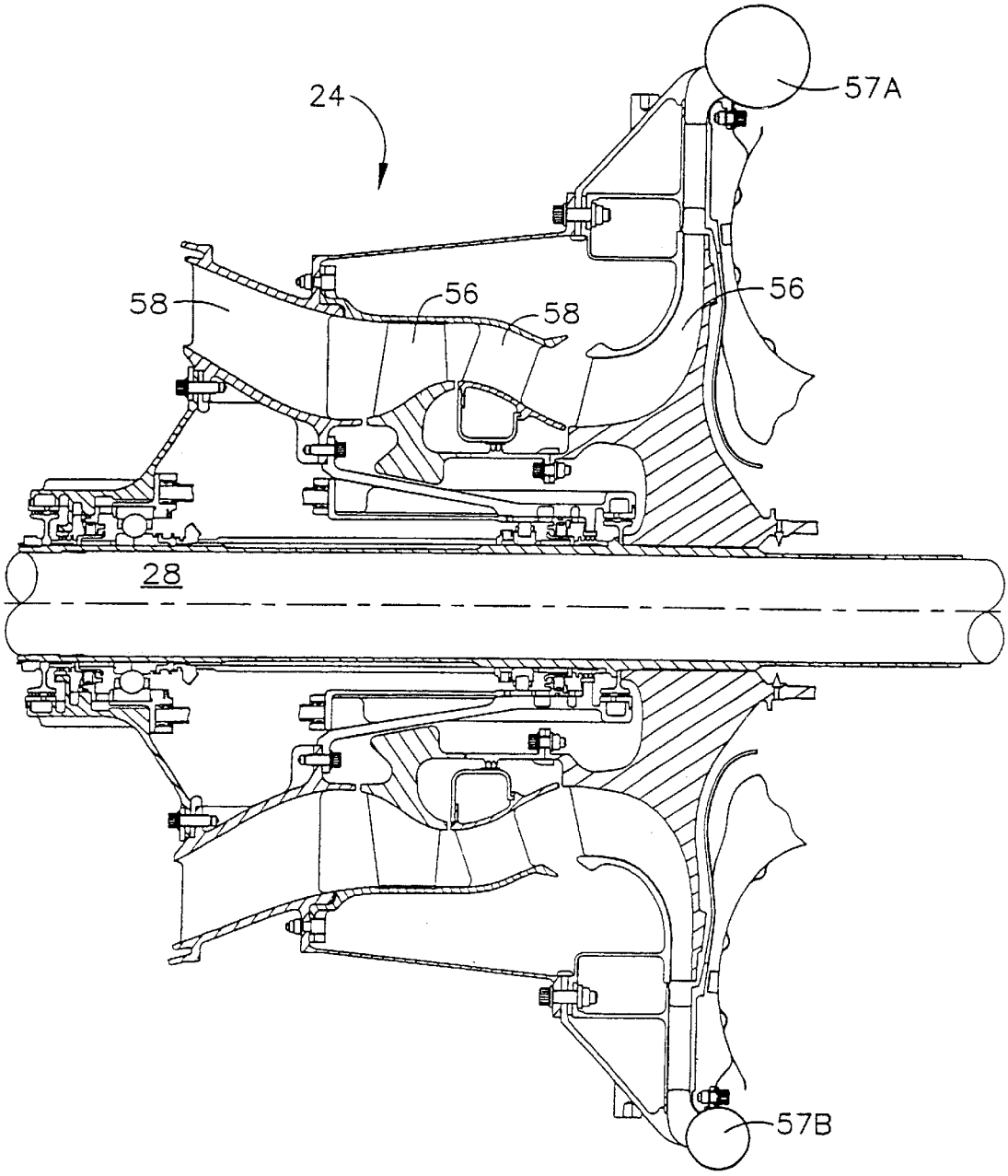
FIG. 5
(AMENDED)

APPARATUS FOR THE DESTRUCTION OF VOLATILE ORGANIC COMPOUNDS

Matter enclosed in heavy brackets [ ] appears in the original patent but forms no part of this reissue specification; matter printed in italics indicates the additions made by reissue.

TECHNICAL FIELD

This invention relates generally to a method and apparatus for the destruction of hazardous materials, such as volatile organic compounds, and more particularly, to the destruction of volatile organic compounds through the use of a turbine engine in order to produce power.

BACKGROUND OF THE INVENTION

Increasingly over the past half century, air quality has become an issue of public concern. Over this period, the scientific community has steadily improved its understanding of the origins of the air pollution that is apparent over most major U.S. cities. A large part of this air pollution is attributable to the release of volatile organic compounds into the atmosphere. As a result, the reduction of the releases of volatile organic compounds has become an increasingly important part of the overall strategy to improve air quality.

The most familiar volatile compound reduction technique is the control of fuel vaporization by vapor recovery techniques, first on automobiles and now on gasoline stations located in nonobtainment areas. As a result, the steady year over year increase in U.S. releases of these compounds has leveled off and is now even declining.

Manufacturing sites are responsible for approximately 8.5 million tons of volatile organic compound emissions annually. Solvent vaporization or in some cases, hydrocarbon byproducts, are key to the manufacturing process of many of the items used regularly in daily life. The manufacture of familiar consumer products results in the release into the atmosphere of significant amounts of organic compounds such as pentane, ethanol, methanol, ethyl acetate, and many others. The control of volatile organic compounds is essential to the environmentally friendly manufacture of these products, and thus, there remains a struggle with the cost of control versus the loss of competitiveness.

The most common control method in use today is the thermal oxidizer. In connection with this method, the volatile solvent is released in amounts generally less than a few thousand parts per million into the plant air system. This air is then selectively collected and fed into a combustion chamber where it is mixed with enough natural gas to sustain combustion. It is then ignited in a large chamber that incinerates the volatile solvent, as well as, the natural gas, thereby producing carbon dioxide and water vapor as the primary products of combustion. These oxidizers are large, complicated devices that represent a major capital expense and require significant amounts of electricity and gas to operate. While heat can sometimes be recovered, generally speaking, thermal oxidizers represent a significant economic loss to the businesses using them. In a typical U.S. industrial plant, the cost of operating this type of device easily adds 25%, and often much more, to the yearly energy bill.

Another current control technology uses solvent recovery methods that pass the air from the plant through an activated charcoal filter. Periodically, the charcoal is heated, driving off highly concentrated volatile compounds into a chilled condensing system. The output is a liquid organic compound often requiring hazardous waste treatment. The cost of operation, as well as the initial capital costs, are significantly higher than the thermal oxidizer, thereby making this control technology less attractive for the majority of industrial sites.

Accordingly, an efficient and cost effective device for the destruction of volatile organic compounds is needed.

Such a device is described and claimed in the copending application U.S. Ser. No. 08/538,692, now U.S. Pat. No. 5,592,811, filed on Oct. 3, 1995, and owned by the assignee of record. The subject matter of that application is hereby incorporated herein by reference.

In that application, a system for the destruction of volatile organic compounds is disclosed which comprises a combustor and a reaction chamber, both of which are suitably connected to the compressor, such as the compressor of a power generator (e.g. a gas turbine engine). The system further comprises a primary inlet to the combustor for supplying a primary fuel and a secondary inlet to the combustor and the reaction chamber for supplying a secondary fuel. The secondary fuel comprises air and an amount of a volatile organic compound. The compressor compresses the secondary fuel and directs the compressed fuel to the combustor and reaction chamber. The fuel mixture is reacted in the reaction chamber, and the stream of combustion gases directed to a power generator to generate power.

While the system so described is suitable for use in many applications, once assembled, particularly if the combustor is provided for direct, in line communication with the inlet of the reaction chamber, the size of the device becomes cumbersome for shipping and maintenance.

Moreover, in operation of the device, particularly when the VOC laden air is drawn from environments which vary over time, i.e. the amount of VOCs in the air varies, control of the system can become difficult.

SUMMARY OF THE INVENTION

A system for the destruction of volatile organic compounds according to the present invention addresses the shortcomings of the prior art, particularly those difficulties which may be encountered during use of a system in accordance with some aspects of the system described in the aforementioned copending application.

In accordance with one aspect of the present invention, a system for the destruction of volatile organic compounds comprises a power generator, a compressor, a combustor and a reaction chamber. A primary inlet to the combustor is provided for supplying a primary fuel to the combustor. A secondary fuel comprising air and at least one volatile organic compound is provided to the compressor. An outlet from the compressor communicates with the reaction chamber and the combustor. The combustor is attached to the reaction chamber such that the flow of combusted gasses is directed tangentially into the reaction chamber, thereby enhancing the residence time of the mixed fuels within the reaction chamber. In addition, the size of the device is suitable for shipping. A power generator is connected to an exit of the reaction chamber and utilizes the exiting fuel mixture to generate power.

In accordance with a further aspect of the present invention, the combustor and the reaction chamber are configured to create a cyclonic flow of the primary and secondary fuels through the reaction chamber. This allows for the fuel to remain in the reaction chamber for a longer period of time, thereby providing for a better stoichiometric reaction.

In accordance, with a further aspect of the present invention, an air flow system is provided to regulate the inlet air and fuel supplies within the combustor and reaction chamber to maintain effective operation of the device.

BRIEF DESCRIPTION OF THE DRAWING FIGURES

The present invention will hereinafter be described in conjunction with the appended drawing figures, wherein like designations denote like elements, and:

FIG. 2 is a schematic drawing of a device of the type shown in FIG. 1 as utilized in an exemplary plant layout;

FIG. 5 is a cross-sectional view of the compressor of the destruction device of FIG. 2;

FIG. 6 is a schematic drawing of an alternative plant layout of a destruction device in accordance with the present invention.

DETAILED DESCRIPTION OF PREFERRED EXEMPLARY EMBODIMENTS

While the way in which the present invention addresses the various disadvantages of the prior art designs will be discussed in greater detail hereinbelow, in general, the present invention provides a volatile organic compound (VOC) destruction device which includes a power generator such that the effective elimination of VOC's also results in the co-generation of power. The power so produced can be converted into electricity, which can in part drive the destruction device as well as produce power for other uses.

Figure 1:
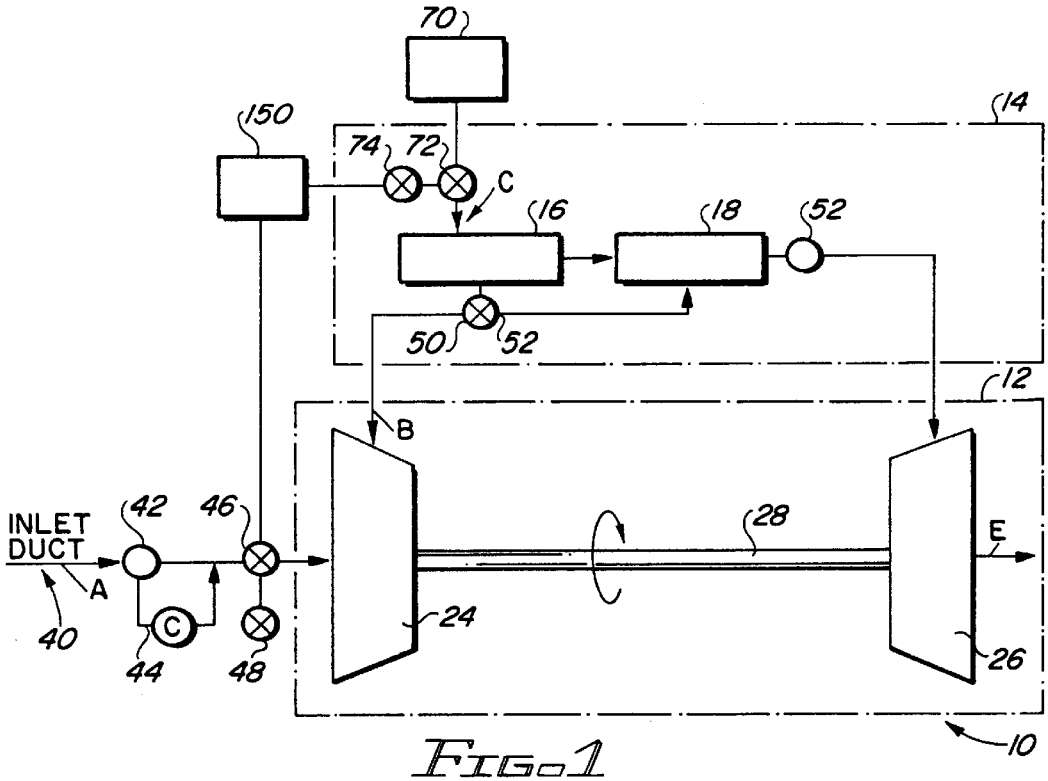
FIG. 1 is a simplified schematic drawing of a destruction device in accordance with the present invention.

With reference to FIGS. 1 and 2, a VOC destruction device 10, in accordance with a preferred embodiment of the present invention, suitably includes a power generator 12 which is driven by a fuel system 14. Fuel system 14 preferably comprises a combustor 16 and a reaction chamber 18. As will be discussed in greater detail hereinbelow, in operation, VOC destruction device 10 utilizes natural gas or any other suitable fuel as a primary fuel supply in a conventional manner. However, in accordance with the present invention, this primary fuel is suitably mixed with a secondary fuel comprising air and preferably VOCs. This fuel mixture of primary and secondary fuels is burned in power generator 12.

In accordance with a preferred embodiment of the present invention, power generator 12 preferably comprises a gas turbine engine, for example an AlliedSignal IE-831 engine, which is produced by AlliedSignal Aerospace, Phoenix, Ariz. has been found to be suitable. However, it should be recognized that any suitable engine can be used in the context of device 10, provided such engine can be suitably employed in the generation of power.

With continued reference to FIG. 2, power generator (engine) 12 is preferably of a conventional design. For example, engine 12 suitably includes, in spaced relation, a generator 20, a gearbox 22, a compressor 24 and a turbine 26. Turbine 26, also preferably of a conventional design, suitably includes a power turbine (not shown) connected to shaft 28. As will be appreciated, shaft 28 is suitably connected to generator 20, gearbox 22 and compressor 24.

In accordance with the present invention, VOC destruction device 10 can be utilized to concurrently destroy VOC's and realize the fuel value of such VOC's produced from a variety of different environments. In this context, the term "VOC" is used broadly to refer to carbon containing compounds, such as hydrocarbons, dioxins, alcohols, ketines aldehydes, ethers, organic acids, halogenated forms of the foregoing and the like. For example, as used herein, the term VOC may refer to pentane, n-ethylmorphilin, toluene, ethanol, methanol, decabromodiphenyloxide, ethyl acetate, benzene, polystyrene and the like. Such VOC's or similar chemical compounds are typically produced from the evaporation of chemicals used in and generated by basic industrial processes to produce plastics, pharmaceuticals, bakery products, printed products and the like. A particularly preferred application of the present invention is in the area of control VOC's produced during the production of expandable polystyrene (i.e. the process to make "styrofoam") where the primary emission is the VOC pentane.

Device 10 can be employed to destroy VOC's which can be collected from the plant as whole, from special isolated or hooded areas, from dryers or from a VOC concentrator utilized in such plants. In the context of the present invention, air from one or more of these environments or areas is referred to as "VOC laden air". It should be appreciated that the amount of VOC present in such air may vary from small amounts or none to larger amounts, over time and as conditions in the plant change. As with typical prior art methods of destroying VOCs or such, the present invention may be employed even over periods of time when the VOC level is small or nonexistent. As such, the term VOC laden air includes air that from time to time may not include a significant quantity (or any amount) of a VOC.

VOC laden air, such as air laden with pentane resulting from the manufacture of expandable polystyrene, is first collected and thereafter suitably passed into device 10. While such VOC laden air may be collected in any conventional manner for use in connection with the present invention, preferably, in such a process, the VOC laden air is ducted from the plant via one or more air ducts. These ducts are directly or indirectly connected to an inlet duct 40 (see FIG. 1) which provides VOC laden air to destruction device 10.

In accordance with a preferred aspect of the present invention, power generator 12 draws in such VOC laden air together with fuel, the combustion gases of both Which flow at high velocity into turbine 26 and thereby drive turbine 26. As previously briefly mentioned, the primary fuel utilized in accordance with the present invention may comprise natural gas; alternatively, diesel oil, jet fuel, methane or any other fuel material may be utilized in an amount sufficient to sustain combustion in combustor 16.

The secondary fuel comprising the VOC laden air is generally much leaner than the primary fuel. Generally speaking, the secondary fuel has a VOC concentration in the range of 0% to 1%. This 1% maximum corresponds to approximately 10,000 parts per million, depending on the type of organic compound involved. Typically this will comply with OSHA regulations as the maximum concentration allowed within plant air in order to prevent the possibility of an explosion within the plant, and in the event permissible limits are exceeded, the concentration can be reduced. However, it should be appreciated that system 10 is capable of handling higher VOC concentrations, as may be desirable in some applications.

With reference to FIG. 1, a simplified schematic view of destruction device 10 is shown. As shown, VOC laden air from inlet duct 40 is suitably directed to power generator 12, and in particular, compressor 24 thereof. Preferably, the temperature of the inlet air A, i.e. the VOC laden air, is at a temperature of less than about 130° F. To this end, a temperature control system 42 is suitably positioned to measure the temperature of the inlet air and in the event the temperature exceeds about 130° F., the air is cooled through a cooling system 44. As will be appreciated by those skilled in the art, cooling system 44 may suitably comprise an air or water heat exchanger suitably configured to cool the temperature of inlet air to a temperature in the range of about 59° to about 130° F.

Once the temperature of inlet air A is within a suitable range, such inlet air A is passed through a control valve 46 which is suitably provided with a VOC monitor 48. As will be discussed in greater detail below, monitor 48 measures the level of VOC within inlet air A. This VOC level measurement, as will be described in greater detail below, is utilized to adjust, as appropriate, the ratio of primary and secondary fuels which are fed into combustor 16. Regulator 46 suitably regulates the flow of air which is drawn into compressor 24.

When device 10 is placed in initial operation, generator 20 is utilized to initially drive compressor 24 (as well as turbine 26) to suitably draw inlet air A into compressor 24. As operation of device 10 continues, the power drawn from generator 20, through gearbox 22, may be suitably decreased and thereafter compressor 24 is, at least in part, and preferably entirely driven by the power generated through operation of device 10, and in particular, through the generation of energy effected by turbine 26.

As discussed briefly above, compressor 24 suitably comprises the compressor of power generator 12. With momentary reference to FIG. 5, compressor 24 preferably comprises alternate respective sets of rotating blades 56 and stationary blades 58. Rotating blades 56 are suitably rotated through rotation of shaft 28, which [is] *as* briefly noted above, is initially activated by generator 20. In accordance with a preferred aspect of the present invention, compressor 24 comprises a multistage compressor, more preferably a two stage compressor, i.e. there are at least [2] *two* rotating *discs containing* blades [(impellers)] 56 within the body of compressor 24.

As will be recognized by those skilled in the art, inlet air A drawn into compressor 24 is suitably compressed to pressures ranges from about 4 to about 30 atmospheres, and preferably to about 9 atmosphere. This compression raises the temperature of inlet air A, and thus the secondary fuel, to ideally about 600° F., but suitably within the range of about 550° F. to about 650° F. The compressed air B then exits compressor 24 through outlets 57A, 57B and preferably enters reaction chamber 18 through inlets 59A, 59B.

With continued reference to FIG. 1, compressed air B is suitably directed to a flow valve 50 which is provided with a monitor 52. Valve 50 suitably controls the amount of compressed air B which is provided to reaction chamber 18 and combustor 16.

As shown best in FIG. 1, a primary fuel inlet 70 provides primary fuel C to combustor 16 through a flow valve 72. Flow valve 72 preferably includes a monitor 74 to monitor the volume of fuel which is provided to combustor 16. As will be described in greater detail hereinbelow, fuel C and a limited amount of compressed air B (including the secondary VOC fuel) is suitably provided to combustor 16, the remaining portion of the secondary fuel being provided to reaction chamber 18. In accordance with a particularly preferred aspect of the present invention, the combination of combustor 16 and reaction chamber 18 is effective to substantially destroy the VOC within compressed air B and provide a mixed combustion gas stream D having a temperature suitable to activate the nozzle and turbine stages of gas turbine 26. In accordance with a preferred aspect of the present invention, the mixed-out temperature of mixed stream D provided to turbine 26 is in the range between about 1500° F. and about 2300° F., preferably about 1850° F.

In a conventional fashion, mixed stream D is directed to turbine 26. Turbine 26 of the type generally described above, is initially started by cranking it over with a starter (not shown) to produce air flow through the compressor. At the appropriate speed, fuel C is permitted to flow into combustor 16. However, once device 10 is in operation, mixed stream D suitably powers turbine 26 in a manner such that the output E from turbine 26 is suitably harnessed and utilized in subsequent operation of device 10, as well as in connection with the production of power for other applications.

Figure 3:
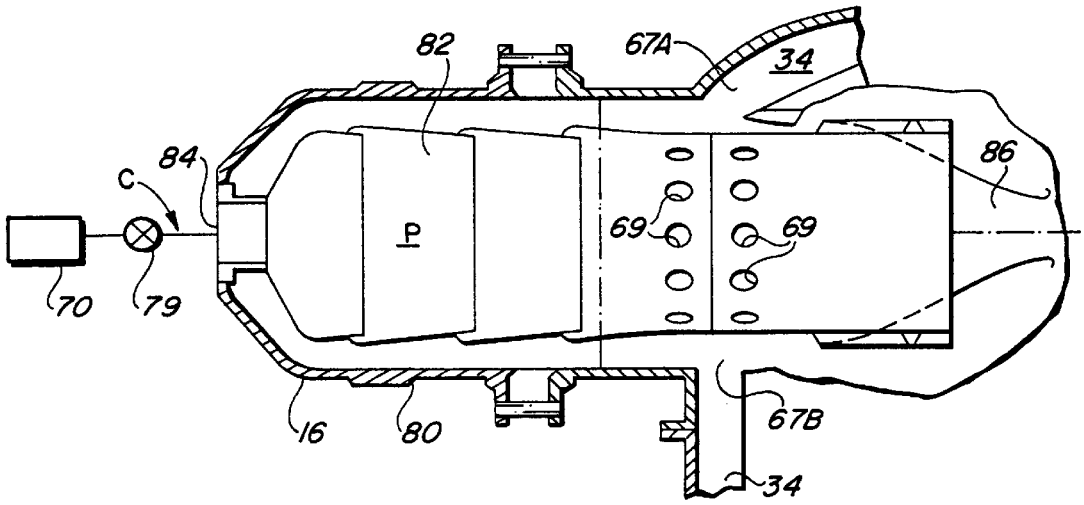
FIG. 3 is a cross-sectional view of a combustor used in connection with the destruction device of FIG. 2.
Figure 4:
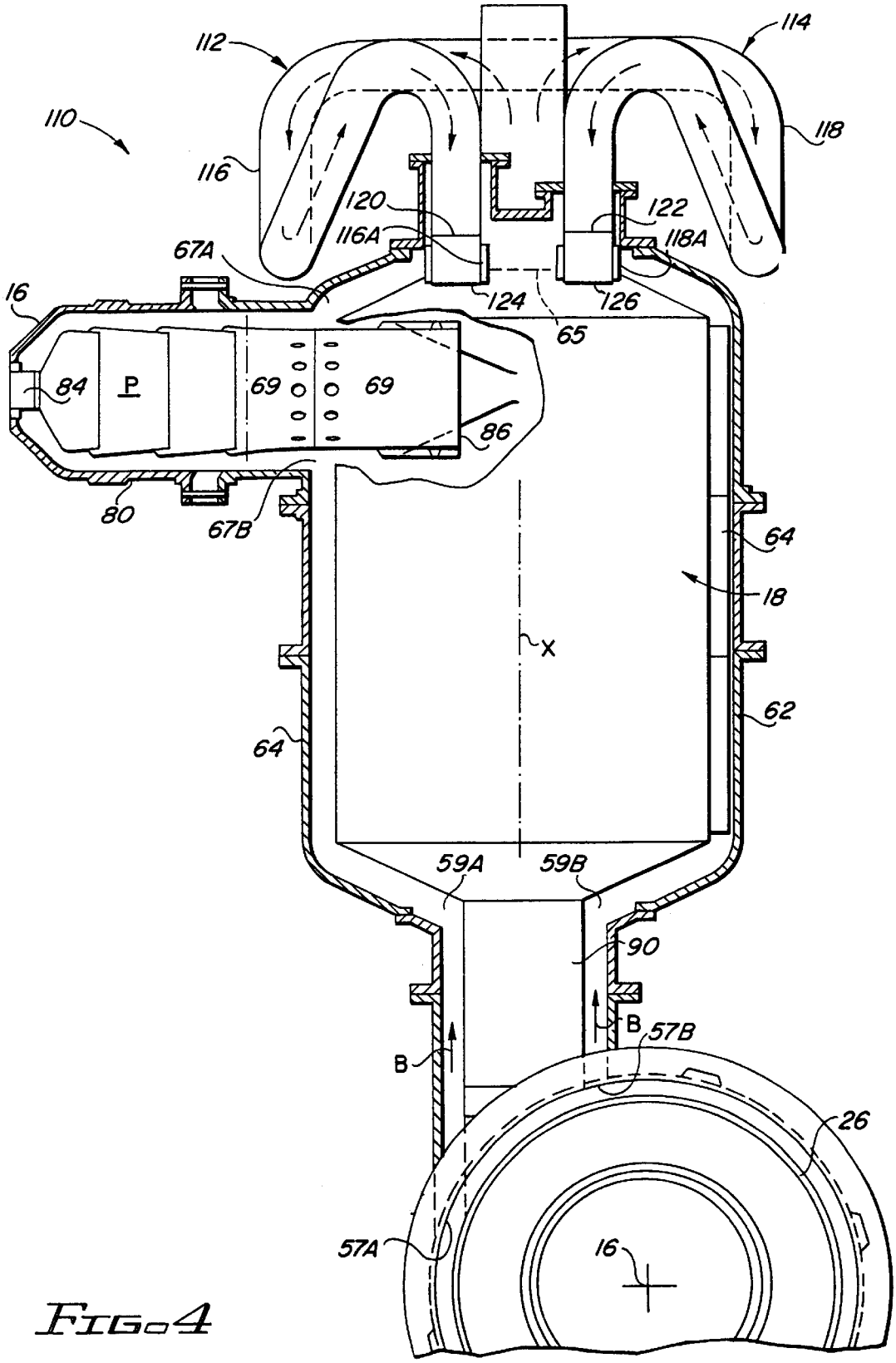
FIG. 4 is a partial cross-sectional view of the combustion device and reaction chamber of the destruction device of FIG. 2.

With reference to FIGS. 3 and 4, the way in which reaction chamber 18 and combustor 16 cooperatively work to effectively destroy the VOC's in the VOC laden air in a manner to suitably drive power generator 12 will now be described in greater detail.

Reaction chamber 18 preferably comprises a double walled vessel having a main, inner wall 60 and an outer wall 62 that envelopes inner wall 60. The chamber 64 defined by walls 60 and 62 is suitably configured and positioned in proximity to compressor 24 to receive compressed air B. Preferably, and with reference to FIGS. 4 and 5, chamber 64 receives compressed air B (containing the secondary fuel) from outlets 57A, 57B of compressor 24. Chamber 64 extends about the periphery of reaction chamber 18. Further, in accordance with a preferred aspect of the present invention, chamber 64 also suitably communicates with combustor 16 in the region of respective openings 67A and 67B by way of a plurality of inlets 69, as well as by way of tube outlets 124, 126. Thus, compressed air B is, in accordance with at least one aspect of the present invention, suitably provided to the combustor 16 and also directly to chamber 64 by way of tubes 116, 118, as will be discussed in further detail below.

With reference to FIG. 3, combustor 16 preferably comprises a hot wall type thermally insulated combustor. Preferably, combustor 16 comprises an outlet wall 80 within which a conventional combustion device 82 is suitably orientated. An inlet 84 communicates with combustion device 82 to advantageously effect combustion of fuel C. As previously briefly mentioned, fuel inlet C is preferably directed from fuel supply 70 through fuel control valve 74 and compressed air B is provided to combustion device 82 through inlets 69. In accordance with preferred aspects of the present invention, fuel supply C is suitably controlled by a control system 150 such that a sufficient amount of primary fuel C is provided to the combustion chamber to effectively maintain an appropriate equivalence ratio (ER) thereby enabling stoichiometrically correct combustion. As shown best in FIGS. 3 and 4, the outlet 86 of combustor 16 suitably communicates with the interior of reaction chamber 18.

Combustor 16 may be attached to reaction chamber 18 in any convenient manner. For example, combustor 16 can be fixably attached to chamber 18 such that outlet 86 of combustor 16 directly communicates with an opening of reaction chamber 18 in an in-line manner. However, in accordance with a preferred aspect of the present invention and as shown best in FIGS. 3 and 4, combustor 16 is attached to reaction chamber 18 such that combustor 16 is orthogonal to the central axis X of reaction chamber 18. In this manner, as will be described in greater detail below, the combustion gases exit outlet 86 of combustor 16 tangentially to reaction chamber 18 thereby tending to create a substantially cyclonic flow of the resulting fuel mixture within reaction chamber 18. While combustor 16 is shown in FIG. 4 as being attached to reaction chamber 18 tangentially near an end of reaction chamber 18 opposite inlets 59a, 59b, it should be appreciated that combustion chamber 16 may be attached in any convenient fashion. For example, combustor 16 may be attached at any angle from about 0 to about 90° from the central axis X of reaction chamber 18 and at any point along a side or the top of reaction chamber 18.

Combustion within combustor 16 takes place in a generally conventional manner, with the exception that compressed air B, i.e. the VOC laden air introduced into the system, is permitted to mix with the primary fuel C within the later stages of combustor 16. As will be appreciated by those skilled in the art, near inlet 84, primary fuel C is relatively rich such that it burns under near stoichiometric conditions, typically at a temperature in the range of about 2500° F. to about 3200° F., preferably between about 2800° F. and about 3000° F. and optimally 3000° F. In this region denoted in FIGS. 3 and 4 as "P", often referred to as the "primary zone", a minor portion of secondary fuel B is suitably mixed with primary fuel thereby creating a fuel mixture of primary and secondary fuels. The minor portion of secondary fuel introduced into the primary-zone P is about 10% to about 30% of the secondary fuel. If the portion falls much below 10%, the fuel will become too rich and thereby cause "rich blowout." While the amount of secondary fuel introduced into combustor 16 will vary, in general preferably from about 0 to about 70%, and more preferably from about 0 to about 50% of the fuel necessary to drive power generator 12 is provided by the secondary fuel.

The residence time of the gas mixture of primary fuel and secondary fuel within reaction chamber 18 is enhanced due to the preferred configuration of combustor 16 relative to reaction chamber 18. Specifically, and in accordance with a preferred aspect of the present invention, as the combustion gases exit the combustor at outlet 86, such gases are directed toward the opposing wall of reaction chamber 18. The flow pattern which results in the interior of reaction chamber 18 tends to be cyclonic, i.e. creating a spiral pattern.

In accordance with a preferred aspect of the present invention, the fuel mixture, comprising primary fuel and secondary fuel is retained in reaction chamber 18 for a sufficient time to effectively burn, i.e. combust the VOC's contained within the secondary fuel B. Typically, the residence time of the gas mixtures within reaction chamber 18 is on the order of about 0.25 seconds or more. In accordance with a preferred design of the present invention, the tangential orientation of the combustor relative the reaction chamber has been found to not only enhance residence time, but also to cause a degree of recirculation within reaction chamber 18 thus further enabling substantially complete destruction of the VOC's within reaction chamber 18.

In practice, the present invention generally results in an excess of 90%, and typically from between about 95 and 99.5% of the VOC contained within secondary fuel B being effectively broken down into water vapor and carbon dioxide. As will be appreciated, and as will be discussed in greater detail below, through effective operation of device 10, substantially all of the VOCs contained within the inlet air A, and thus compressed air B, are thus effectively destroyed within reaction chamber 18 and/or combustor 16.

The double-walled configuration of reaction chamber 18, which permits flow of compressed air B through the outer chamber 64 advantageously provides for a modicum of cooling of the reaction chamber. For example, in the region of the outlet 90 of reaction chamber 18 cooling tends to take place due to the generally lower temperature of the compressed air B as compared to the temperature of the combusting fuel mixture within the inner portion chamber of reaction chamber 18.

Outlet 90 of chamber 18 suitably communicates with turbine 26 of power generator 12. In a conventional fashion, the high velocity flows of the combusted gas mixture flow onto turbine 26 to thereby drive it. Turbine 26 is suitably configured, in a conventional fashion, to produce usable power to not only continue operation of device 10, but also to provide power for other applications. For example, through utilization of a preferred gas turbine engine, e.g. an AlliedSignal IE-831 engine, in connection with destruction device 10 of the present invention, power sufficient to run compressor 24 and up to an additional 525 kw of electricity have been found to be obtainable.

With reference to FIG. 2, in accordance with a preferred embodiment of the present invention, power generator 12 is suitably positioned such that the exhaust heat E is directed to a heat recovery system 100. Heat recovery system 100 may be of conventional design and operate in a conventional fashion. For example, system 100 may comprise a heat recovery steam generator suitably configured and positioned to provide usable hot water 102 and steam 104. As also shown in FIG. 2, water 102 can be converted into power sufficient to power gearbox 22, thereby obviating the continuing need for generator 20, and steam 104 can be released as process heat or recirculated into the regional combustor 16.

Alternatively, exhaust E may be directly used. Exhaust E is generally at a temperature of about 1000° F., and thus can be used to heat the plant directly. Because as much as about 99.5% or more of the VOCs have been effectively destroyed through operation of device 10, exhaust E can be released directly into the atmosphere.

In accordance with a further aspect of a preferred exemplary embodiment of the present invention, device 10 is suitably provided with an inlet air control system 110. With reference to FIG. 4, system 110 may advantageously comprise a bypass flow circuit comprising respective bypass flow channels 112, 114.

As will be appreciated by those skilled in the art, combustor 16 requires a certain primary-zone fuel-to-air ratio to operate properly, typically 0.04 to 0.05, while power generator 12 typically requires a fuel-to-air ratio of approximately 0.008–0.01. Accordingly, the fuel ratio within combustor 16 generally should be richer than, e.g. about four to five times as rich as, the overall fuel ratio required by the generator 12 at idle or with no load. If the VOC concentration within the air inlet A is too high, the fuel mixture within the combustor 16 will become too lean, thereby causing the combustor to "flame out." "Flame out" occurs when the fuel to air mixture within the combustor primary-zone P becomes too lean to sustain a flame. In accordance with this aspect of the present invention, air control system 110 is provided for the purpose of enabling enrichment of the fuel burned within combustor 16. As will be discussed in greater detail below, control system 150 monitors and controls the concentration of the VOC within the secondary fuel, as well as the overall fuel to air ratio within the combustor, by causing a portion of the compressed air B to be directed only within reaction chamber 18 and not into combustor 16.

Preferably, flow channels 112, 114 of system 110 each comprise respective tubes 116 and 118. Preferably, tubes 116 and 118 are suitably attached to reaction chamber 18 at 116A, 118A and are in fluid communication with chamber 64 at inlets 124 and 126. Tubes 116 and 118 each preferably include respective valves 120 and 122, which may comprise any conventional flow control valve, such as a general poppet-type valve or the like. Tubes 116, 118 are in fluid communication with duct 65, which is in fluid communication with chamber 64, such that when valves 120, 122 are opened, the pressure with chamber 64 pushes a portion of the compressed air B out of chamber 64 through duct 65 and into tubes 116, 118. This portion of compressed air B then travels through the tubes 116, 118 and exits through outlets 124, 126 causing air B to thereby bypass the combustor 16. In a preferred embodiment, when the valves 120, 122 are closed, all of compressed air B enters combustor 16 in the region of openings 67A and 67B via inlets 69.

Preferably, as shown, channels 112 and 114, as well as duct 65, comprise a single tube that allow for the adequate bypass of compressed air B from chamber 64 directly into reaction chamber 18. However, other arrangements for accomplishing this objective easily can be devised and employed in the context of the present invention. Due to size considerations, generally the number of channels 112, 114 are minimized to two or three, and preferably even one; however, additional channels may be employed as desired.

Inlet air control system 110 can be activated manually or through the computer control associated with control system 150, which will now be described.

Preferably, control system 150 is a computer based system suitably configured and arranged to control, among other things, power generator 12 and fuel supply C, as well as inlet and outlet air from device 10. In general, control system 150 operates in a conventional manner to control power generator 12 including, among other things, compressor 24 and turbine 26. Further, in a conventional fashion, control system 150 operates to start device 10 initially and monitor operation of device 10 as device 10 begins to operate due to the burning of primary fuel A and secondary fuel C.

Control system 150, however, differs from conventional gas turbine and other industrial engine controls in that system 150 operates to monitor and, as necessary, adjust fuel supplies A and C, as well as air control system 110 to achieve optimum levels of efficiency and ensure that device 10 safely and effectively remains operative. As previously noted, and with momentary reference to FIG. 1, control system communicates and utilizes information received from sensors 42, 48, 52, and 72. In addition, one or more sensors 152 may be utilized which are incorporated in proximity to or within reaction chamber 18 or combustor 16. (While sensor 152 is shown in FIG. 1 as being outside of both chamber 18 and combustor 16, its location is only illustrative of its position (or the positions) somewhere within fuel control system 14). In cooperation, these sensors provide information reflective of, among other things: VOC level in inlet air (e.g. sensor 48); temperature and flow rate of inlet air A, compressed air B, fuel C, mixed stream D and the like; fuel content and volume (e.g. sensor 74); power output from device 10; and speeds of turbine 26. With this and other information, control system suitably controls the operation of device 10.

For example, when the power output of power generator 12 drops below an expected level for the measured full consumption of fuel C, thus indicating, for example, that the fuel mixture within combustor 16 may be becoming too lean, control system 150 may activate control system 110. In such cases, valves 120, 122 will be opened thereby creating a pressure difference sufficient to draw compressed air B out of the chamber 64 and into the bypass flow channels 112, 114, which in turn, direct compressed air B into reaction chamber 18 thus preventing its flow into combustor 16. Operation of control system 150 in this manner prevents the fuel mixture within combustor 16 from becoming too lean, while still allowing for the VOC laden air to be reacted with the primary fuel within reaction chamber 18 to thereby destroy the VOC concentration and retain the VOC fuel value.

Stated another way, control system 150, by monitoring the varying VOC level in inlet air A, and thus the corresponding fuel valve of inlet air, adjusts device 10 for appropriate operation. For example, in the case where inlet air A has a fuel valve in excess of that necessary to drive power generator 12 at idle alone, control system 150 suitably reduces the flow of fuel C and as necessary, activates air control system 110 to prevent generator 12 from operating at excessive speeds and/or combustor from operating at excessively lean or such levels.

Control system 150 may also be employed to compensate for the relatively long lag time between fuel introduction and changes in conditions at inlet 90 to turbine 26 caused by reactions taking place within reaction chamber 18, as well as to monitor or control other aspects of device 10. Control system 150 may employ any number of control processes and perform various computations known to those skilled in the art.

In accordance with a further embodiment of the present invention, and with reference to FIG. 6, in some cases, it may be desirable to initially treat VOC laden air from a typical plant prior to destroying the VOC's contained therein. In accordance with this aspect of the present invention, an air treatment system 200 is advantageously employed and communicates with one or more destruction devices, for example respective destruction devices 10A and 10B. Destruction devices 10A and 10B are in a form similar to device 10 described above. System 200 suitably comprises an inlet 202 which cooperates with, for example, inlet air duct 40. Inlet air A is thereafter drawn into chamber 203 where inlet air A is both cooled and sampled to determine the level of VOCs in inlet air A. Preferably, one or more sensors 206 are suitably carried within chamber 203 for the purpose of determining the VOC level within inlet air A.

In the event inlet air A is determined to be laden with an unacceptable level of VOC, an inlet bypass device 208 opens to allow fresh air into chamber 203. Preferably, bypass device 208 comprises a shutter valve of conventional design.

In addition, inlet air A is suitably cooled to a temperature within an acceptable range. Preferably, such cooling is effected through a heat exchanger system 205. Preferably system 205 comprises respective heat exchange elements 204, 218, outlet 210 and cooling fan 222. As will be appreciated by those skilled in the art, element 204 is suitably connected via outlet and duct elements (not shown) to cooling pump 211 and heat exchange element 218 such that cooling fluid is suitably recirculated between elements 204 and 218. In a conventional manner, system 205 allows for the cooling of inlet air A. Inlet air A once cooled, is passed through a centrifugal separator 212 separating the VOC laden air from any large particles. Once separated, the VOC laden air is communicated to devices 10A and 10B, preferably by respective conduits 214 and 216. As previously briefly mentioned, devices 10A and 10B operate in a fashion similar to that of device 10 described above to generate respective exhausts E1, E2 which are released into the plant to provide process heat through respective outlet 230, 232.

Figure 7:
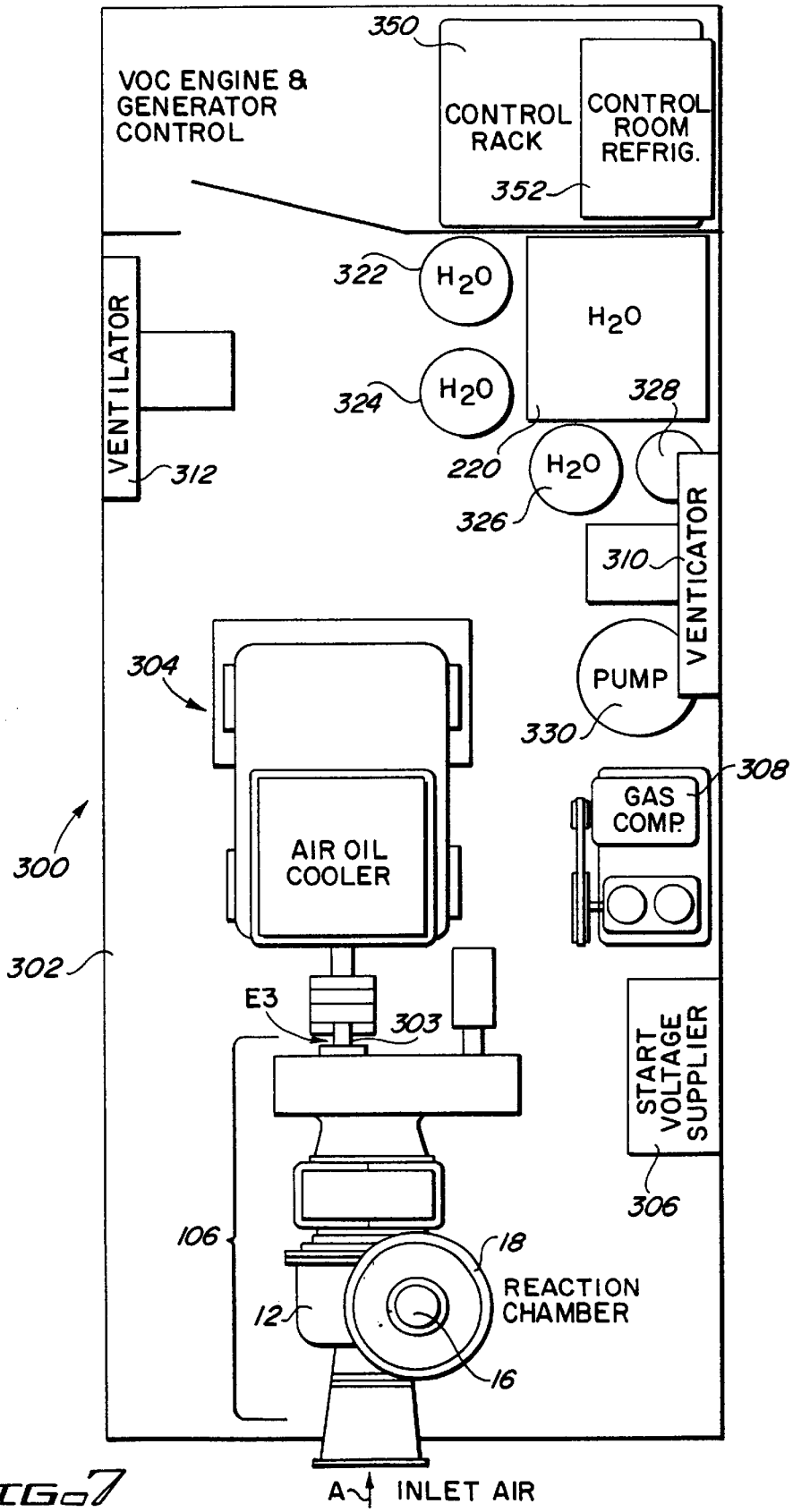
FIG. 7 is a further alternative embodiment of a mobile layout of a destruction device in accordance with the present invention.

With reference to FIG. 7, a further alternative embodiment of the present invention is shown. With certain applications, it may be desirable to utilize a destruction device in accordance with the present invention in a relatively mobile fashion. As shown in FIG. 7, a mobile destruction system 300 suitably comprises a sled 302 upon which a destruction device 10C is suitably mounted. Destruction device 10C is suitably configured in a manner similar to that of device 10 described hereinabove. As so configured, device 10C includes power generator 12 to which reaction chamber 18 and combustor 16 are suitably attached. The output of device 10C, namely exhaust E3 is suitably communicated via outlet 303 into a heat recovery air-oil cooler 304. In accordance with this embodiment of the present invention, a voltage source 306 is suitably provided to provide startup power to device 10C, as well as power, at least initially, to the other aspects of system 300. A gas compressor 308 is also suitably mounted to sled 302 for raising gas pressure to levels required by device 10C. Respective ventilators 310, 312 may be also suitably mounted to sled 302. In addition, a water supply 320 with respective auxiliary units 322, 324, 326, 328 and pump 330 may also be utilized for purposes of water injection into the combustor 16 to control emissions of nitrous oxide.

System 300 is suitably controlled through operation of a control system 350 which may be optionally cooled through operation of a refrigeration device 352. Various other devices such as ventilators, switch and other electronic devices may be also employed, in a conventional fashion, for a effective use of device 10C in connection with mobile system 300.

Preliminary experimental tests of devices embodying the present invention have indicated that by using the VOC laden secondary fuel, the amount of primary fuel needed to operate the engine is reduced without a loss of energy content in the fuel supply. Accordingly, the use of this volatile organic compound destruction system 10 results in substantially complete destruction of the volatile organic compound while reducing the amount of primary fuel required to operate an engine for the generation of electricity.

Thus, it will be appreciated that device 10 provides significant advantages over prior art designs for destruction of VOCs. For example, in accordance with experiments preformed using devices embodying preferred aspects of the present invention, substantially destruction of VOC laden air efficiency (e.g. at rates above 99.5%) at a level of about 6200 $ft^3$/min can be obtained with the production of a nominal 525 kw of electrical power.

To illustrate the overall impact of the present invention, consider a typical plant using 640,000 kw hours per month with a need to consume 12,000 cubic feet per minute of air laden with 3,500 parts per million of a VOC. Consider further that the plant consumes 97,000 therms of fossil fuel each month. Without control, over 800 metric tons per year of VOC's are released into the atmosphere.

While prior art techniques (e.g. use of a thermal oxidizer) may reduce the emission to less than 50 metric tons per year of VOC's, use of such devices increases the plant energy consumption to about 125,000 therms per month.

In contradistinction, through use of a device embodying the present invention, effective VOC control is enabled with less energy. Specifically, in this example, the energy consumed and therefore, total fossil fuels burned, falls to 81,000 therms per month. Not only are the total operating costs for the plant reduced, but there is also a net reduction in the emission of carbon dioxide, nitric oxide and sulfur oxide. The sum effect of use of the present invention to control volatile organic emissions is thus cleaner air, less fossil fuel consumption and resulting lower costs.

It will be understood that the foregoing description is of the preferred exemplary embodiments of the invention, and that the invention is not limited to the specific forms shown. Various modifications may be made in the design and arrangement of the elements set forth herein without departing from the scope of the invention as expressed in the appended claims.

We claim:

1. A system for the destruction of volatile organic compounds (VOCs) comprising:

a reaction chamber, said reaction chamber having a central axis;

a combustor attached to said reaction chamber substantially perpendicular to sail central axis;

an engine connected to said reaction chamber;

wherein said system is configured to receive a primary fuel and a secondary fuel, said secondary fuel comprising VOC laden air, and wherein said primary fuel is combusted in said combustor and said secondary fuel is combusted in said combustor and said reaction chamber.

2. The system of claim 1 further comprising a compressor.

3. The system of claim 2 wherein said system further comprises an air inlet duct, said inlet duct operatively connected to said compressor and enabling the communication to said compressor of said secondary fuel.

4. The system of claim 3, wherein said compressor is operatively connected to said combustor and said reaction chamber.

5. The system of claim 4 wherein said reaction chamber defines a passageway, said passageway communicating with a compressor outlet and an interior of said reaction chamber.

6. The system of claim 5 further comprising a bypass system operatively connected to said passageway, said bypass system configured to at least partially prevent flow of compressed secondary fuel to said combustor when said system is activated.

7. The system of claim 6 further comprising means for activating said bypass system.

8. The system of claim 7 wherein said activation means comprises means for monitoring VOC levels in said secondary fuel, means for monitoring the flow of said primary fuel and means for monitoring performance of said engine.

9. A system for the destruction of volatile organic compounds (VOCs) and the co-generation of power comprising:

a power generator including a compressor and a turbine;

a reaction chamber having a first section, a second section, and an interior, said first section communicating with an outlet of said compressor and said second section communicating with an inlet to said turbine;

a combustor attached to said reaction chamber, said combustor having an inlet configured to receive a primary fuel supply and an outlet configured to direct combustion gases from said combustor into said reaction chamber in a manner effective to achieve a substantially cyclonic flow pattern of said combustion gasses; and an air inlet connected to said compressor such that operation of said compressor draws in air laden with at least one VOC; wherein said compressor, in operation, compresses said inlet air to produce an amount of compressed inlet air;

said first section of said reaction chamber communicates with said interior of said reaction chamber and with said combustor such that a first portion of said compressed inlet air is directed by said first section of said combustor and a second portion of said compressed inlet air is directed by said first section to said reaction chamber; and said combustor and said reaction chamber are configured to destroy said at least one VOC and to direct said combustion gasses from said reaction chamber into said turbine inlet to drive said turbine.

10. The system of claim 9, wherein said power generator comprises a gas turbine engine.

11. The system of claim 10, wherein said air inlet includes an air inlet sensor configured to measure the amount of said at least one VOC in said inlet air; said primary fuel supply is provided by a primary fuel system, said primary fuel system including a flow sensor configured to measure the flow of said primary fuel supply directed to said combustor; said power generator includes a speed sensor configured to measure the speed of said turbine; and said inlet sensor, said flow sensor, and said speed sensor provide information for controlling the operation of said system.

12. The system of claim 11 further comprising a bypass system including at least one duct means attached to said first section of said reaction chamber for preventing said compressed inlet air from being directed into said combustor.

13. The system of claim 12, further comprising a computer control system configured to receive said sensor measurements and initiate operation of said bypass systems.

* * * * *